United States Patent [19]

Yoshida

[11] Patent Number: 5,542,080
[45] Date of Patent: Jul. 30, 1996

[54] METHOD FOR CONTROLLING EXECUTION OF DATA DRIVEN TYPE INFORMATION PROCESSOR

[75] Inventor: Shinichi Yoshida, Nara-ken, Japan

[73] Assignee: Sharp Kabushiki Kaisha, Osaka, Japan

[21] Appl. No.: 265,613

[22] Filed: Jun. 24, 1994

Related U.S. Application Data

[63] Continuation of Ser. No. 751,123, Aug. 28, 1991, abandoned.

[30] Foreign Application Priority Data

Aug. 28, 1990 [JP] Japan ................................. 2-227062

[51] Int. Cl.$^6$ .............................. G06F 9/00; G06F 15/82
[52] U.S. Cl. ................ 395/800; 364/232.22; 364/260; 364/260.3; 364/263.3; 364/DIG. 1
[58] Field of Search ..................................... 395/375, 800

[56] References Cited

U.S. PATENT DOCUMENTS

| | | | |
|---|---|---|---|
| 5,093,919 | 3/1992 | Yoshida et al. | 395/800 |
| 5,218,706 | 6/1993 | Komoni et al. | 395/800 |
| 5,363,491 | 11/1994 | Komoni et al. | 395/800 |
| 5,404,550 | 4/1995 | Horst | 395/650 |

*Primary Examiner*—Kevin J. Teska
*Assistant Examiner*—Ayni Mohamed

[57] ABSTRACT

When a copy process is successively performed twice or more and an input buffer in a program storing portion holds a data packet, a new data packet is generated based on a data packet input to an information fetching portion, and the new data packet is output. At the same time, 1 is added to the destination information of the data packet input to the information fetching portion and a through packet flag of that data packet is set to "ON", and the data packet is output. The data packet with the through packet flag set to "ON" passes through a data pair detecting portion and an operation processing portion without being subjected to any processing, thereby returning to a program storing portion. A copy process is performed based on the returned data packet.

30 Claims, 10 Drawing Sheets

| DESTINATION FIELD | INSTRUCTION FIELD | DATA 1 FIELD | DATA 2 FIELD |

| | DESTINATION INFORMATION | INSTRUCTION INFORMATION | COPY PRESENCE / ABSENCE INFORMATION |
|---|---|---|---|
| $D_1 \rightarrow$ | $D_2$ | op2 | 「PRESENCE」 |
| $(D_1+1)$ | $D_3$ | op3 | 「PRESENCE」 |
| $(D_1+2)$ | $D_4$ | op4 | 「ABSENCE」 |
| $D_2 \rightarrow$ | $D_5$ | op5 | 「PRESENCE」 |
| $(D_2+1)$ | $D_6$ | op6 | 「ABSENCE」 |
| $D_3 \rightarrow$ | $D_5$ | op5 | 「ABSENCE」 |
| $D_4 \rightarrow$ | $D_6$ | op6 | 「ABSENCE」 |
| $D_5 \rightarrow$ | | | |
| ⋮ | | ⋮ | |

| | DESTINATION INFORMATION | INSTRUCTION INFORMATION | COPY PRESENCE / ABSENCE INFORMATION |
|---|---|---|---|
| D1 → | D2 | op2 | 「PRESENCE」 |
| | D10 | nop | 「ABSENCE」 |
| D10 → | D3 | op3 | 「PRESENCE」 |
| | D4 | op4 | 「ABSENCE」 |
| D2 → | D5 | op5 | 「PRESENCE」 |
| | D6 | op6 | 「ABSENCE」 |
| D3 → | D5 | op5 | 「ABSENCE」 |
| D4 → | D6 | op6 | 「ABSENCE」 |
| D5 → | | | |

METHOD FOR CONTROLLING EXECUTION OF DATA DRIVEN TYPE INFORMATION PROCESSOR

CROSS-REFERENCE TO RELATED APPLICATION

This application is a continuation of application Ser. No. 07/751,123 filed on Aug. 28, 1991, now abandoned.

This application is related to copending application Ser. No. 07/260,045 filed Oct. 20, 1988, commonly assigned with the present invention.

BACKGROUND OF THE INVENTION

1. Field of the Invention

The present invention relates generally to a method for controlling execution of a data driven type information processor, and more particularly, to a method for controlling execution of data packets in a copying process.

2. Description of the Background Art

In a conventional von Neumann type computer, various instructions are stored as a program in a program memory in advance and the addresses in the program memory are sequentially designated by a program counter to sequentially read the instructions to be executed.

A data driven type information processor is one type of non-von Neumann the computers having no concept of sequential execution of instructions by a program counter. Such a data driven type information processor employs architecture based on a parallel processing of instructions. In the data driven type information processor, collection of data which are to be operated on renders an instruction executable and a plurality of instructions are simultaneously driven by the data to execute the program in a parallel manner in accordance with the natural flow of the data. As a result, a time period required for the operation is significantly reduced.

FIG. 6 is a block diagram showing one example of an arrangement of a conventional data driven type information processing device. FIG. 7 is a block diagram showing an arrangement of a program storing portion contained in the information processing device. FIG. 8 is a diagram showing one example of a filed arrangement of a data packet to be processed by the information processing device.

The data packet shown in FIG. 8 comprises a destination field, an instruction filed, a data 1 field and a data 2 field. The destination field stores destination information, the instruction field stores instruction information, and the data 1 field or the data 2 field stores operand data.

The information processing device shown in FIG. 6 comprises a program storing portion 1, a data pair generating portion 2 and an operation processing portion 3. The program storing portion 1 and the data pair generating portion 2 are coupled to each other by data transmission paths 4 and 5. The data pair generating portion 2 and the operation processing portion 3 are coupled to each other by a data transmission path 6 and the operation processing portion 3 and the program storing portion 1 are coupled to each other by a transmission path 7.

The program storing portion 1 is disclosed in more detail in U.S. application Ser. No. 07/260,045, now U.S. Pat. No. 5,093,919, filed Oct. 20, 1988.

The program storing portion 1 includes an information fetching portion 8, an input buffer 10 and an output buffer 11 as shown in FIG. 7. The input buffer 10 comprises a plurality of data latches 9a, 9b and 9c. The information fetching portion 8 has two output ports. The output buffer 11 comprises data latches 11a and 11b connected between one output port of the information fetching device 8 and the data transmission path 4 and data latches 11c and 11d connected between the other output port of the portion 8 and the data transmission path 5. The input buffer 10 and the output buffer 11 serve to transfer data packets stored in each data latch to each data latch in the subsequent stage with the lapse of time.

The information fetching portion 8 stores the data flow program shown in FIG. 9. Each row of the data flow program comprises destination information, instruction information and copy presence/absence information. As shown in FIG. 9, the information fetching portion 8 reads destination information, instruction information and copy presence/absence information of the data flow program by addressing based on the destination information of an input data packet, stores the destination information and the instruction information in the destination field and the instruction field of the data packet and outputs the data packet.

The data pair generating portion 2 queues data packets output from the program storing portion 1. More specifically, the data pair generating portion 2 detects two different data packets having the same destination information, stores the operand data (the contents of the data 1 field in FIG. 8) of one of the data packets in the data 2 field of the other data packet and outputs the other data packet.

The operation processing portion 3 performs an operation processing with respect to a data packet output from the data pair generating portion 2 based on the instruction information of the data packet, stores the result of the operation processing in the data 1 field of the data packet and outputs the data packet to the program storing portion 1.

As a data packet continues to circulate through the program storing portion 1, the data pair generating portion 2, the operation processing portion 3, the program storing portion 1, . . . , the operation processing proceeds in accordance with the data flow program stored in the program storing portion 1.

FIG. 10 is a diagram showing one example of a data flow program. FIG. 11 is a diagram showing a part of the storage contents of the program storing portion 1 corresponding to the data flow program shown in FIG. 10.

In FIG. 10, N1–N9 are nodes. D1–D9 denote the node numbers of the nodes N1–N9, respectively and op1–op9 denote the operation codes of the nodes N1–N9, respectively. The node numbers D1–D9 correspond to destination information and op1–op9 correspond to instruction information.

For example, the operation result at the node N1 is referred to by the nodes N2, N3 and N4. In this case, a copy process is carried out at the program storing portion 1.

The copy process will be described. The contents of a row addressed based on the destination information of an input data packet is read from the data flow program. At this time, when the copy presence/absence information indicates "absence", the data packet is output with the contents of the destination field and the instruction field updated to complete the processing.

Conversely, when the copy presence/absence information indicates "presence", the data packet is output with the contents of the destination field and the instruction field updated, and destination information, instruction information and copy presence/absence information stored in the subsequent row are read out. When the copy presence/absence information read out from the subsequent row indicates "absence", the same data as that of the input data packet is stored in the data 1 field of another data packet and the destination information and the instruction information which have been just read out are respectively stored in the destination field and the instruction field of said another data packet, which packet is output. If the copy presence/absence information read out from the subsequent row indicates "presence", the same copy processing will be further repeated.

FIG. 12 is a schematic diagram showing an execution state of the data flow program of FIG. 10.

At time T, the data latch 9c in the proceeding stage to the information fetching portion 8 holds a data packet including destination information D1. The latches 9b and 9a in further proceeding stage hold data packets including destination information D7 and destination information D8, respectively. Such is a state just before the data packet including the destination information D1 is input to the information fetching portion 8.

At time T+Δt, the information fetching portion 8 receives the data packet including the destination information D1, at which a processing is carried out with respect to the data packet. Herein Δt represents a time period required for the information fetching portion 8 to read destination information, instruction information and copy presence/absence information in a subsequent row by addressing based on the destination information of an input data packet received, to store said destination information and said instruction information in the destination field anti the instruction field of the input data packet and to output said data packet. The data latches 9a–9c and 11a–11d respectively constituting the input buffer 10 and the output buffer 11 transfer data packets held therein to the data latches in the succeeding stage at a time interval of Δt. At time T+Δt, the data packet including the destination information D7 and the data packet including the destination information D8 are transferred to the data latches 9c and 9b in their subsequent stages, respectively.

At time T+2·Δt, the information fetching portion 8 outputs a data packet including the destination information D2 and a data packet including the destination information D3 to the data latches 11a and 11c, respectively, as a result of the processing with respect to the data packet including the destination information D1 in accordance with the data flow program shown in FIGS. 10 and 11. With only the two data latches 11a and 11c connected to the output ports, the information fetching portion 8 is not allowed to output a data packet including the destination information D4. Therefore, the information fetching portion 8 successively performs the processing with respect to the data packet including the destination information D1. As a result, the information fetching portion 8 receives no packet including the destination D7. In other words, at time T+2·Δt, the data packet including the destination information D7 and the data packet including the destination information D8 are held in the same data latches 9c and 9d as those at time T+Δt. At this time, another packet is transferred to the data latch 9a.

At time T+3·Δt, the information fetching portion 8 outputs a data packet including the destination information D4 to the data latch 11a as a result of the processing with respect to the data packet including the destination information D1 performed at time T+2·Δt in accordance with the data flow program shown in FIGS. 10 and 11. At this time, the information fetching portion 8 performs a processing with respect to a data packet including the destination information D7, while the data packet including the destination information D8 and the subsequent data packet are transferred to the data latches 9c and 9d in their subsequent stages, respectively.

In the above-described execution control system for copy processing of data packets, when a data packet having three or more destinations is input as is done at time T+Δt and time T+2·Δt of FIG. 12 (when two or more copy processings are carried out), a data packet in each data latch of the input buffer 10 is not allowed to proceed to the subsequent stage but to stay.

When data packets are input to the information fetching portion 8 at a low flow rate, even if a data packet temporarily stays in the input buffer 10 of the program storing portion 1, the stay will be eliminated in due course. However, when data packets are input to the information fetching portion 8 at a high rate and the data flow program requires copy processing to be performed many times, data packets exceeding the allowable amount might stay in the input buffer 10 of the program storing portion 1 to stop the data driven type information processing device.

The following method is presented to prevent data packets from staying in the input buffer 10 of the program storing portion 1.

As shown in FIG. 13, the data flow program of FIG. 10 is changed such that each node has less than 3 destinations. FIG. 14 is a diagram showing a part of the storage contents of the program storing portion 1 corresponding to the data flow program of FIG. 13.

As shown in FIGS. 13 and 14, a node N10 is provided between a node N1 and nodes N3 and N4, for example. The operation code nop (no operation) of the node N10 indicates that an input data packet is output without being subjected to any operation processing. The provision of the node N10 changes the node N1 having three destinations in FIG. 10 to have two destinations in FIG. 13.

FIG. 15 is a schematic diagram showing an execution state of the data flow program of FIG. 13.

The states at times T and T+Δt are the same as those shown in FIG. 12. At time T+2·Δt, the information fetching porion 8 outputs a data packet having the destination information D2 and a data packet having the destination information D10 to the data latches 11a and 11c, respectively, as a result of the processing with respect to the data packet including the destination information D1 in accordance with the data flow program shown in FIGS. 13 and 14. At this time, the operation fetching portion 8 performs a processing with respect to the data packet including the destination information D7, while the data packet including the destination information D8 is transferred to the data latch 9c.

At time T+3·Δt, the information fetching portion 8 outputs a data packet including the destination information D9 to the data latch 11a as a result of the processing with respect to the data packet including the destination information D7 in accordance with the data flow program shown in FIGS. 13 and 14.

Since the data flow program shown in FIG. 13 is changed not to generate a data packet having three or more destinations, there occurs no stay of data packets in the input buffer 10 of the program storing portion 1.

According to the above-described method, however, addition of nodes having an operation code nop increases the amount of object code of the data flow program, thereby increasing an execution time period for executing these nodes during an operation processing.

SUMMARY OF THE INVENTION

An object of the present invention is to provide an execution control method by which a data packet staying in the input buffer caused during a copy process, can be prevented without increasing an execution time period.

Another object of the present invention is to provide a data driven type information processing device with an improved execution efficiency of a data flow program.

The method for controlling execution of a data driven type information processing device according to the present invention includes the steps of determining a flow rate of data packets to be input to a program storing portion, determining the number of the consecutive copy processes, limiting the number of copy processings to be executed to prevent data packets from staying in an input buffer, based on the determined flow rate and the determined number of consecutive copy processings, and outputting data packets for executing the remaining copy processes left by the limitation.

The data driven type information processing device according to another aspect of the present invention includes a program storing portion and a data packet processing portion. The program storing portion has both functions of storing a data flow program to generate a new data packet from the data flow program based on an input data packet and performing a copy processes to generate a plurality of data packets at the same time. The program storing portion limits the number of copy processes to be executed to prevent data packets from staying in an input buffer based on a flow rate of data packets to be input and the number of consecutive copy processings, and outputs data packets for executing the remaining copy processes left by the limitation. The data packet processing portion performs a processing with respect to a data packet output from the program storing portion and applies a data packet including the processing result to the program storing portion.

According to the above-described execution control method, the number of data packets output from the program storing portion is controlled based on a flow rate of data packets to be input to the program storing portion. As a result, it is possible to prevent data packets exceeding the allowable amount from being introduced into a data transmission path.

It is therefore possible to prevent data packets from staying in an input buffer during a copy process without increasing a time required for executing a program. As a result, a data driven type information processing device can be implemented with an improved execution efficiency of a data flow program.

The foregoing and other objects, features, aspects and advantages of the present invention will become more apparent from the following detailed description of the present invention when taken in conjunction with the accompanying drawings. It should be understood, however, that the detailed description and specific examples, while indicating preferred embodiments of the invention, are given by way of illustration only, because various changes and modifications within the spirit and scope of the invention will become apparent to those skilled in the art in view of this detailed description.

BRIEF DESCRIPTION OF THE DRAWINGS

The present invention will become more fully understood from the detailed description given hereinbelow and the accompanying drawings which are given by way of illustration only, and thus are not limitative of the present invention.

DESCRIPTION OF THE PREFERRED EMBODIMENTS

Figure 1:
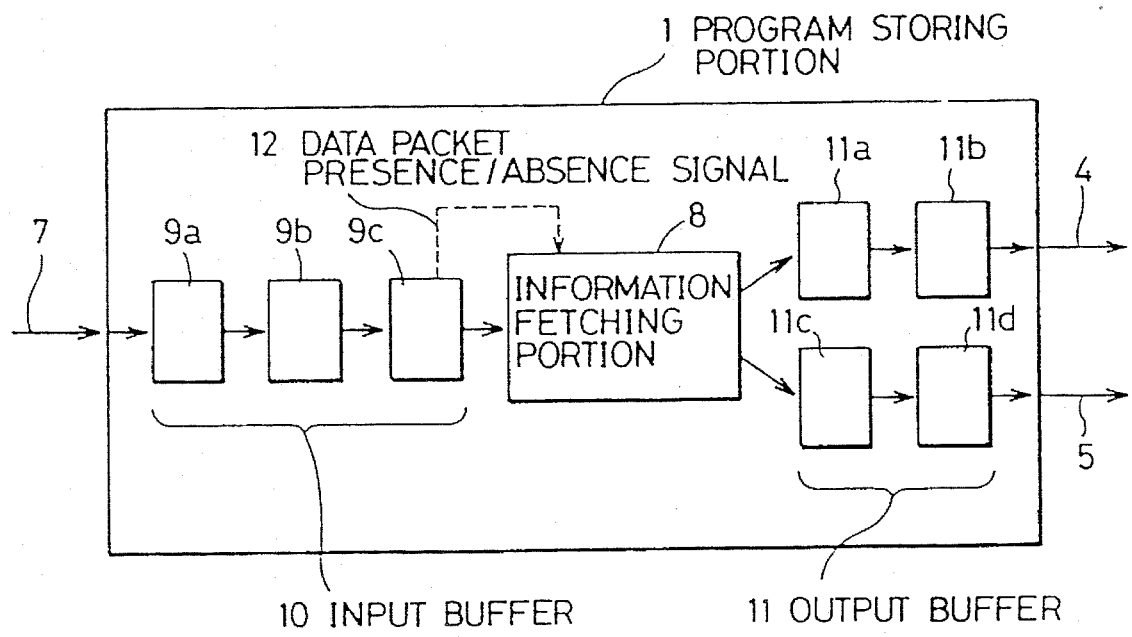
FIG. 1 is a block diagram showing an arrangement of a program storing portion in a data driven type information processing device employing an execution control method according to one embodiment of the present invention.
Figure 6:
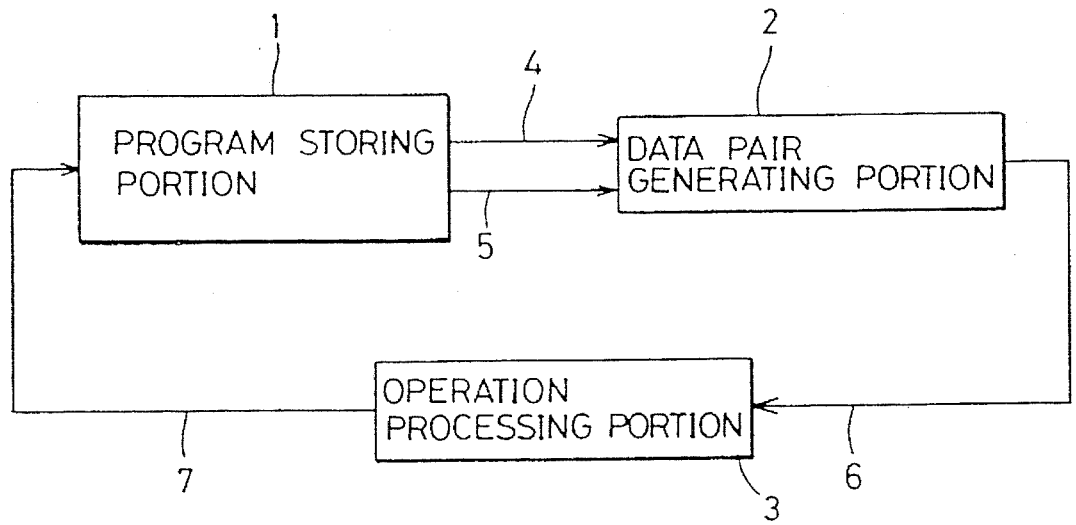
FIG. 6 is a block diagram showing the entire arrangement of the data driven type information processing device.
Figure 7:
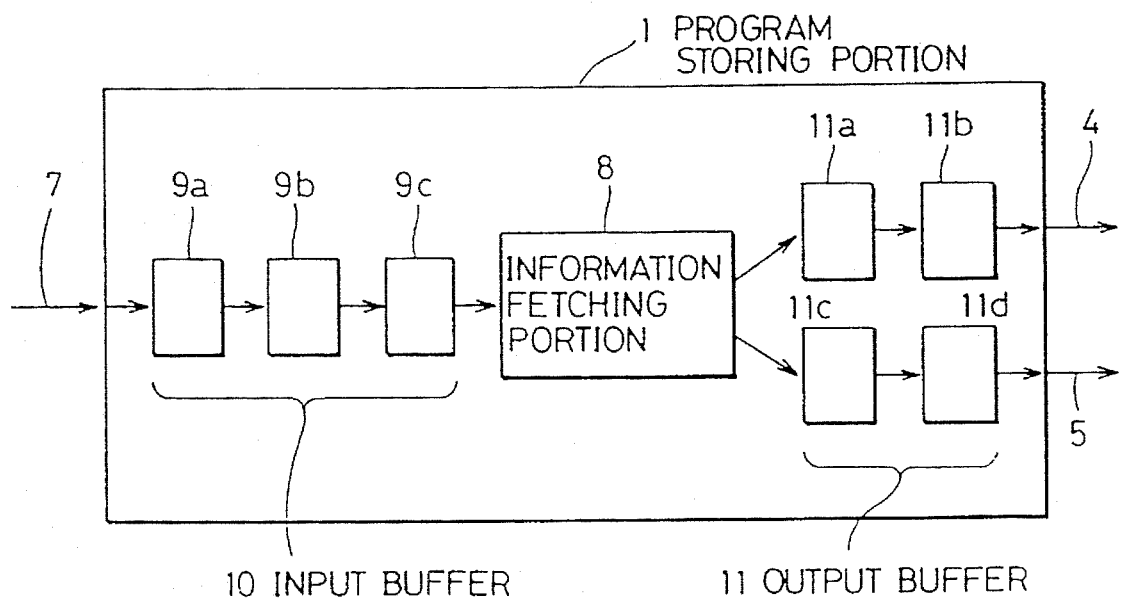
FIG. 7 is a block diagram showing an arrangement of a program storing portion included in a conventional data driven type information processing device.
Figures 8, 9:
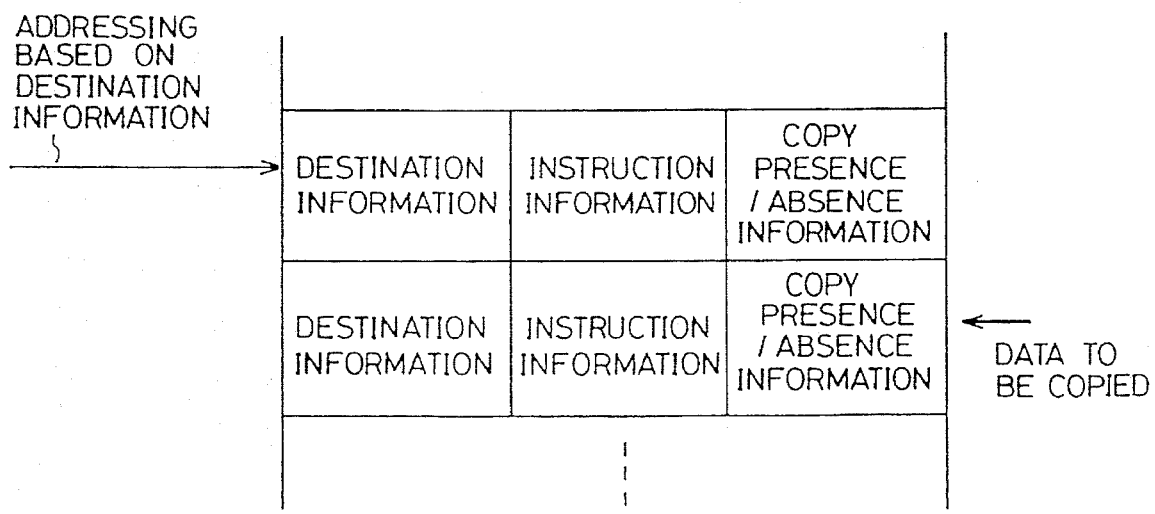
FIG. 8 is a diagram showing a field arrangement of a data packet to be processed in the information processing device of FIG. 7.
FIG. 9 is a diagram showing a part of the data flow program stored in a program storing portion of the data driven type information processing device.

FIG. 1 is a block diagram showing an arrangement of a program storing portion of a data driven type information processing device employing an execution control method according to this embodiment. The entire arrangement of the data driven type information processing device is the same as that shown in FIG. 6.

In FIG. 1, a data latch 9c included in an input buffer 10 applies a data packet presence/absence signal 12 indicative of presence/absence of a data packet to an information fetching portion 8.

Figure 2:
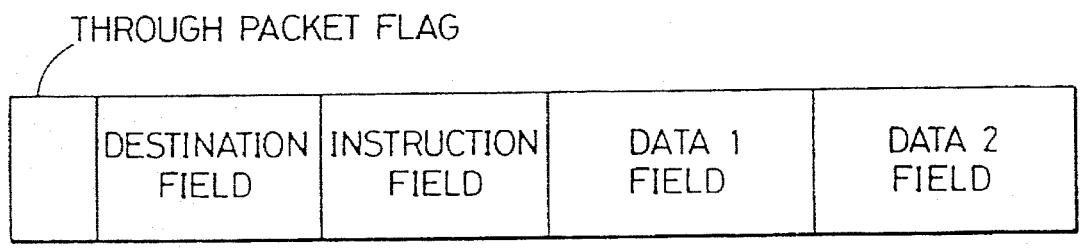
FIG. 2 is a diagram showing a field arrangement of a data packet to be processed according to the present embodiment.

FIG. 2 is a diagram showing a field arrangement of a data packet to be processed in the present embodiment. The data packet shown in FIG. 2 comprises a through packet flag in addition to a destination field, an instruction field, a data 1 field and a data 2 field.

Figure 3:
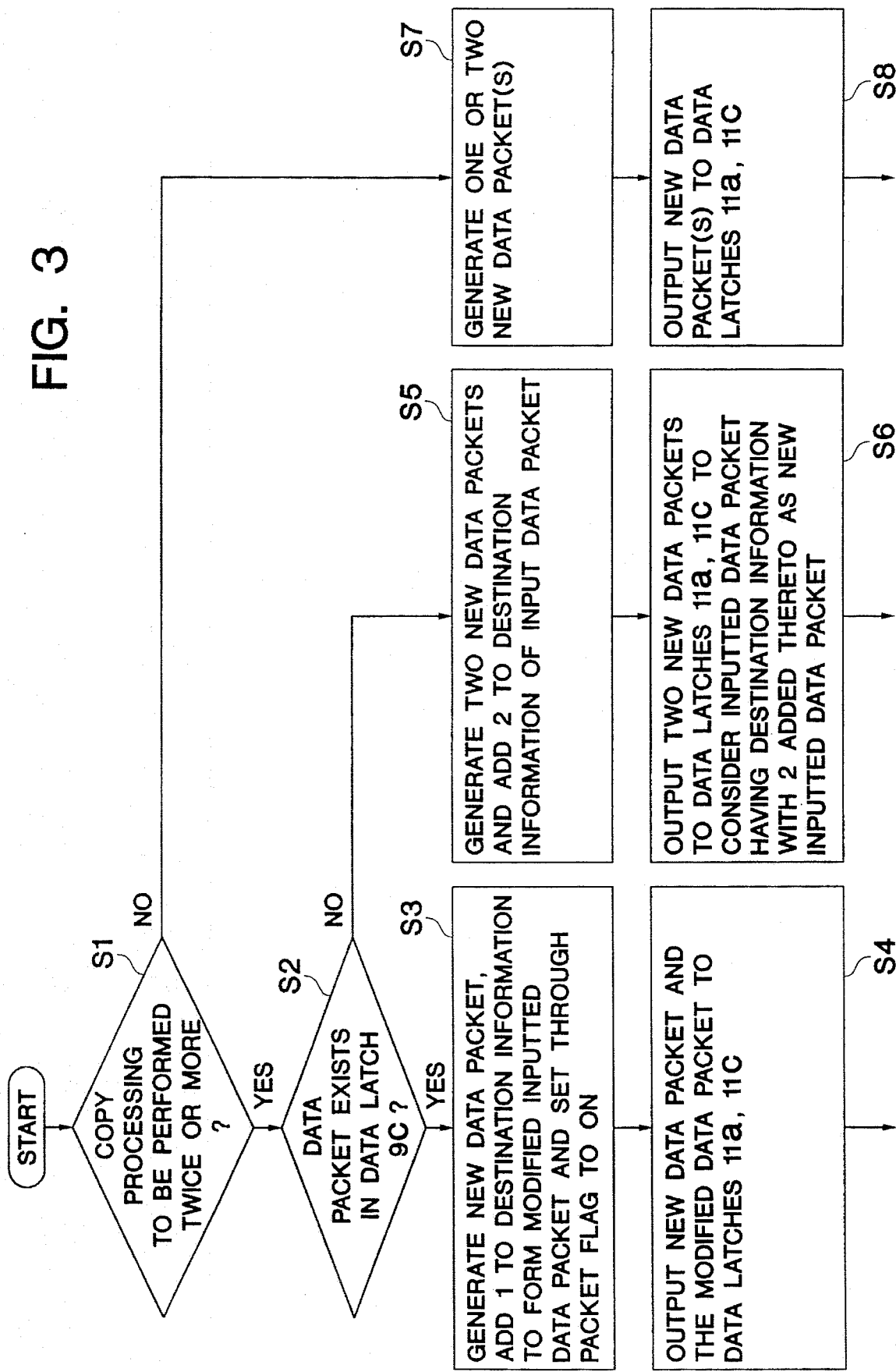
FIG. 3 is a flow chart explaining the execution control method according to the present embodiment.

FIG. 3 is a flow chart explaining the execution control method of the present embodiment. The information fetching portion 8 examines the contents of the part addressed based on the destination information of an input data packet and a state of a data latch 9c in the preceding stage. Determination is made at step S1 as to whether a copy processing is successively performed twice or more. Then at step S2, determination is made as to whether a data packet exists in the data latch 9c or not.

(1) The processing of step S3 is performed when the contents of the part addressed based on the destination information of the input data packet has three or more destinations (when there are two or more consecutive copy presence/absence information set to "presence"), and a data exists in the data latch 9c in the preceding stage to the information fetching portion 8. Determination as to whether a data packet exists in the data latch 9c or not is determined by the data packet presence/absence signal 12 input to the information fetching portion 8.

At step S3, destination information and the instruction information are read from the row addressed based on the destination information of the input data packet to generate a new data packet including the read destination information and instruction information. In addition, 1 is added to the destination information of the input data packet to set the through packet flag of said data packet to "ON". The new data packet and the input data packet are output to the data latches 11a and 11c, respectively, at step S4.

(2) The processing of step S5 is performed when the contents of the part addressed based on the destination information of the input data packet has three or more destinations and there exists no data packet in the data latch 9c in the preceding stage to the information fetching portion 8.

At step S5, destination information and instruction information are read from the row addressed based on the destination information of an input data packet to generate a new data packet including the read destination information and instruction information. In addition, destination information and instruction information are read from a row subsequent to the addressed row to generate a new data packet including the read destination information And instruction information. Furthermore, 2 is added to the destination information of the input data packet, which input data packet is held.

At step S6, two new data packets are output to the data latches 11a and 11c, respectively, while destination information and instruction information are read from the data flow program by addressing based on the destination information of the held data packet to generate a new data packet including the destination information and the instruction information.

In this case, since it is ensured that no new data packet is to be input to the information fetching portion 8, the processing is continued by considering the data packet including the destination information with 2 added thereto as an input of a new data packet.

(3) When the contents of the part addressed based on the destination information of an input data packet has only two or less destinations, the processing of step S7 is performed irrespective of presence of a data packet in the data latch 9c in the preceding stage to the information fetching portion 8. At step S7, destination information and instruction information are read from the row addressed based on the destination information of the input data packet to generate a new data packet including these destination information and instruction information. When the copy presence/absence information indicates "presence", destination information and instruction information are read from the subsequent row to generate a new data packet including these destination information and instruction information.

At step S8, one or two new generated data packets are output to one or both of the data latches 11a and 11c.

In the above-described (2) and (3) processings, the through packet flag of a data packet output from the information fetching portion 8 is set to "OFF". When the through packet flag of the data packet is set to "ON", the data packet passes through the data pair generating portion 2 and the operation processing portion 3 without being subjected to any processing to return to the program storing portion 1 again.

Figure 4:
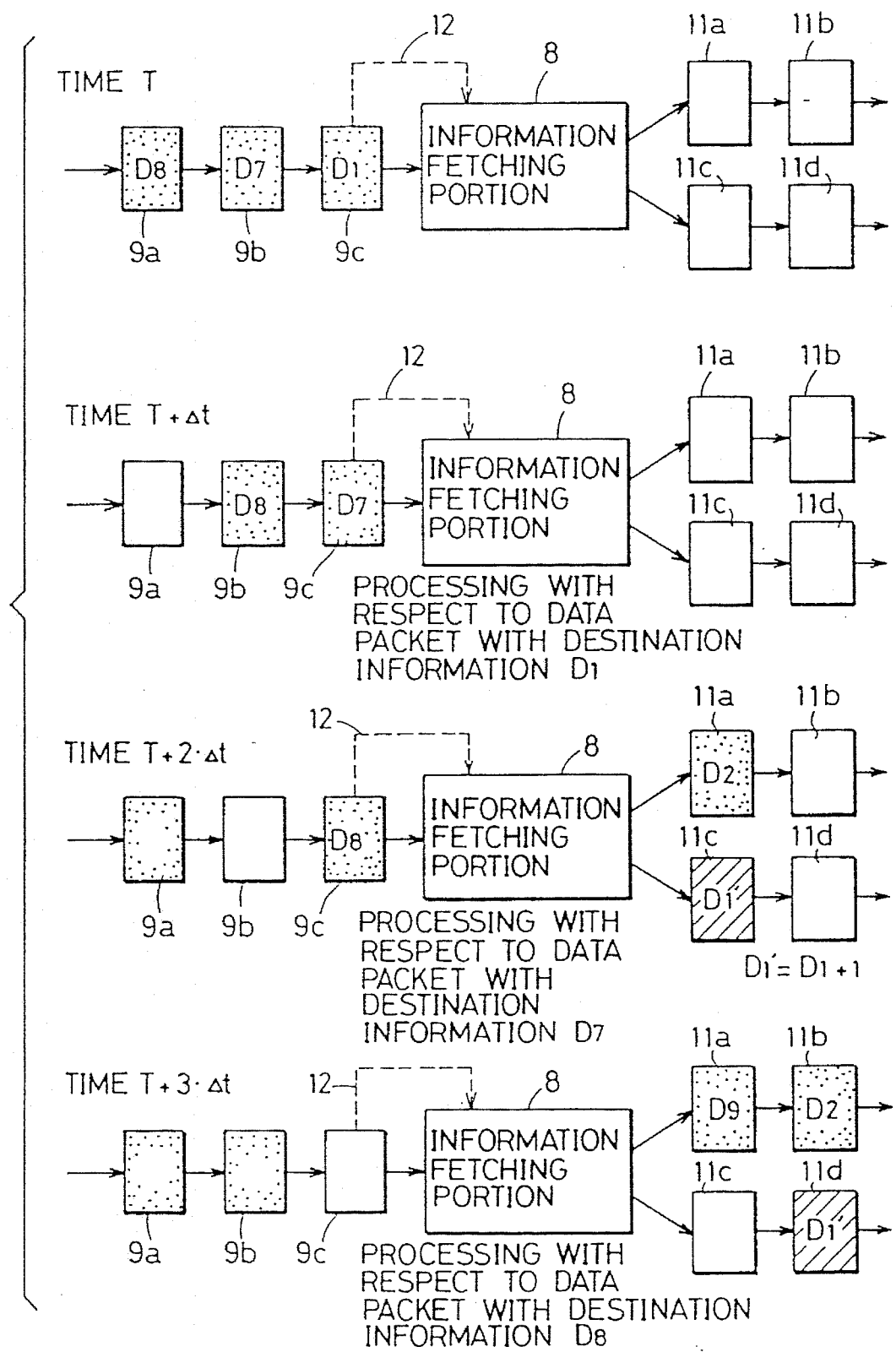
FIG. 4 is a schematic diagram showing one example of an execution state of the present embodiment.
Figures 10, 11:
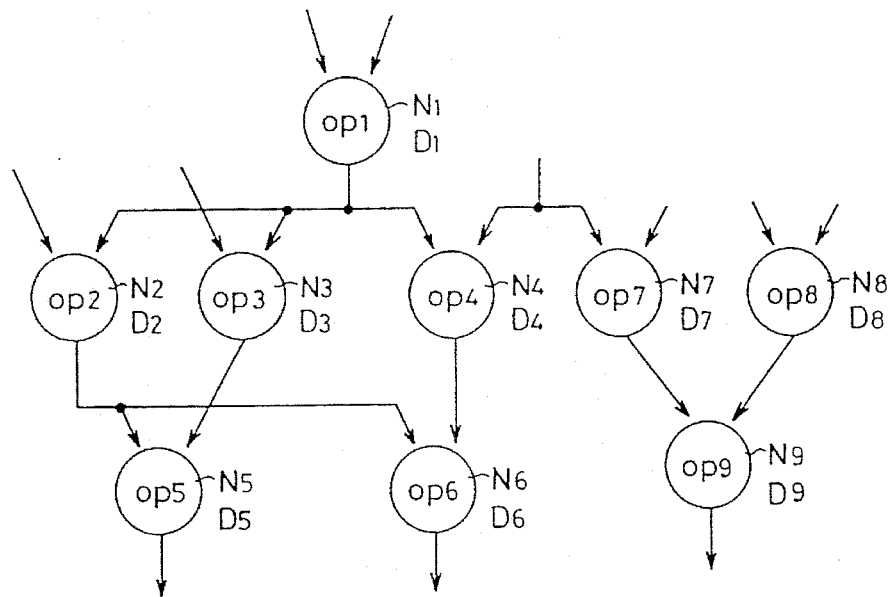
FIG. 10 is a diagram showing one example of a data flow program including a copy process.
FIG. 11 is a diagram showing the storage contents of the program storing portion corresponding to the data flow program of FIG. 10.

FIG. 4 is a schematic diagram showing one example of an execution state of the data flow program shown in FIGS. 10 and 11.

At time T, a data packet including the destination information D1, a data packet including the destination information D7 and a data packet including the destination information D8 are held at the data latches 9c, 9b and 9a of the input buffer 10, respectively.

At time T+$\Delta$t, the information fetching portion 8 performs a processing with respect to a data packet including the destination information D1. At this time, the data latch 9 holds the data packet including the destination information D7. In addition, FIGS. 10 and 11 show that the contents of the part addressed based on the destination information D1 has three destinations. The above-described (1) processing is therefore performed.

As a result, a data packet including the destination information D2 and a data packet including the destination information D1' are output to the data latches 11a and 11c, respectively, at time T+2·$\Delta$t. Herein, D1'=D1+1. The through packet flag of the data packet including the destination information D1' is set to "ON". At this time, the information fetching portion 8 carries out a processing with respect to the data packet including the destination information D7.

As a result, a data packet including the destination information D9 is output to the data latch 11a at time T+3·$\Delta$t.

Figures 13, 14:
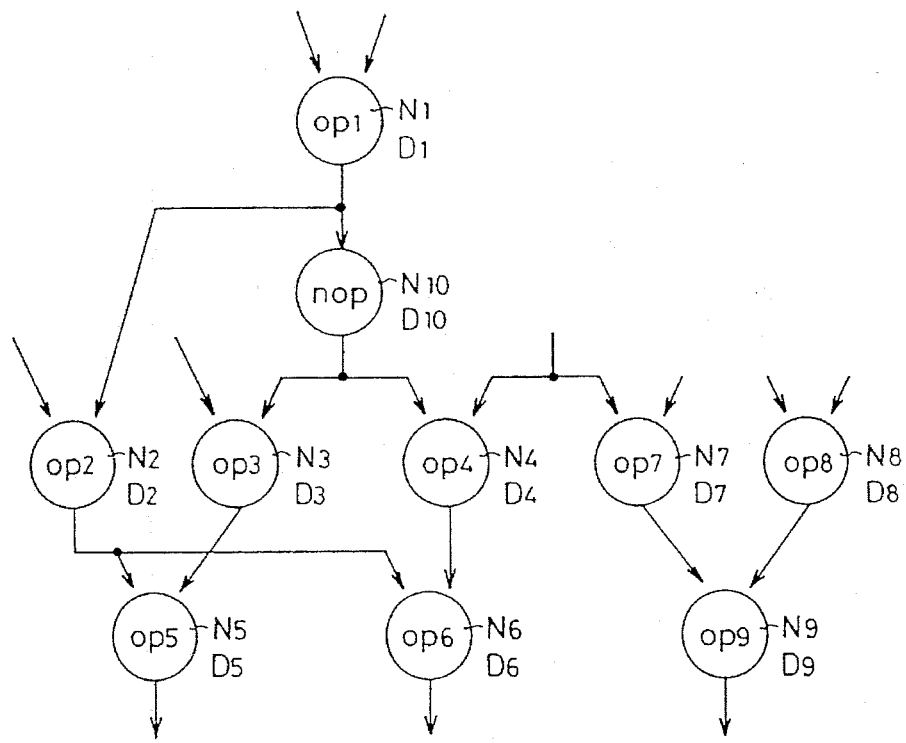
FIG. 13 is a diagram showing another example of a data flow program including a copy processing.
FIG. 14 is a diagram showing the storage contents of the program storing portion corresponding to the data flow program of FIG. 13.
Figure 15:
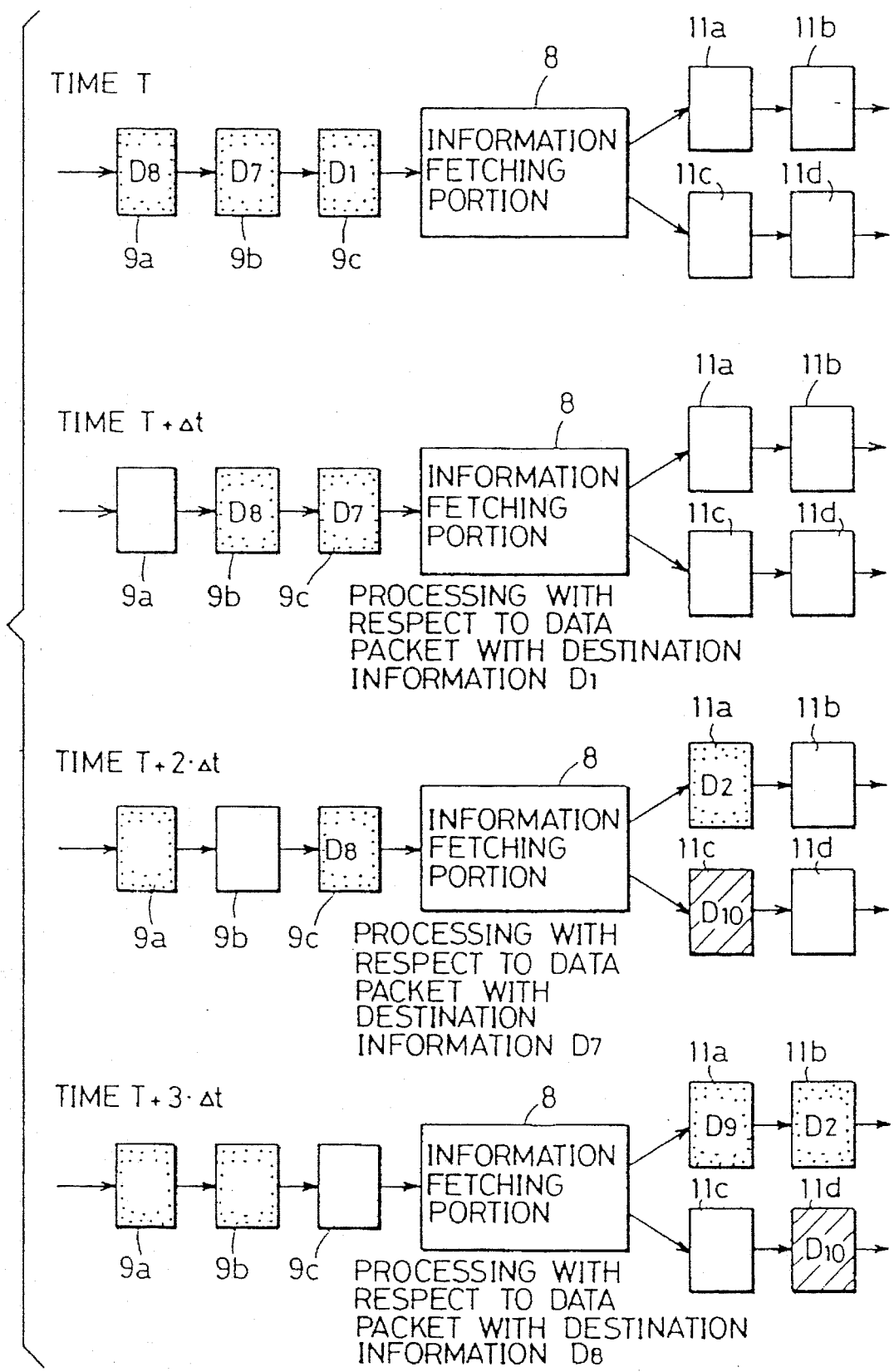
FIG. 15 is a schematic diagram showing a conventional execution state of the data flow program shown in FIGS. 13 and 14.

Thereafter, the data packet including the destination information D1' and having the through packet flag set to "ON" passes through the data pair generating portion 2 and the operation processing portion 3 without being subjected to any processing to return to the program storing portion 1 again. As a result, a data packet including the destination information D3 and a data packet including the destination information D4 are output from the program storing portion 1. Thus, the same effect can be obtained as obtained by a static provision of a node in the data flow program as shown in FIG. 13. Therefore, no data packet stay occurs in the input buffer 10 of the program storing portion 1 and the data transmission path 7.

Figure 5:
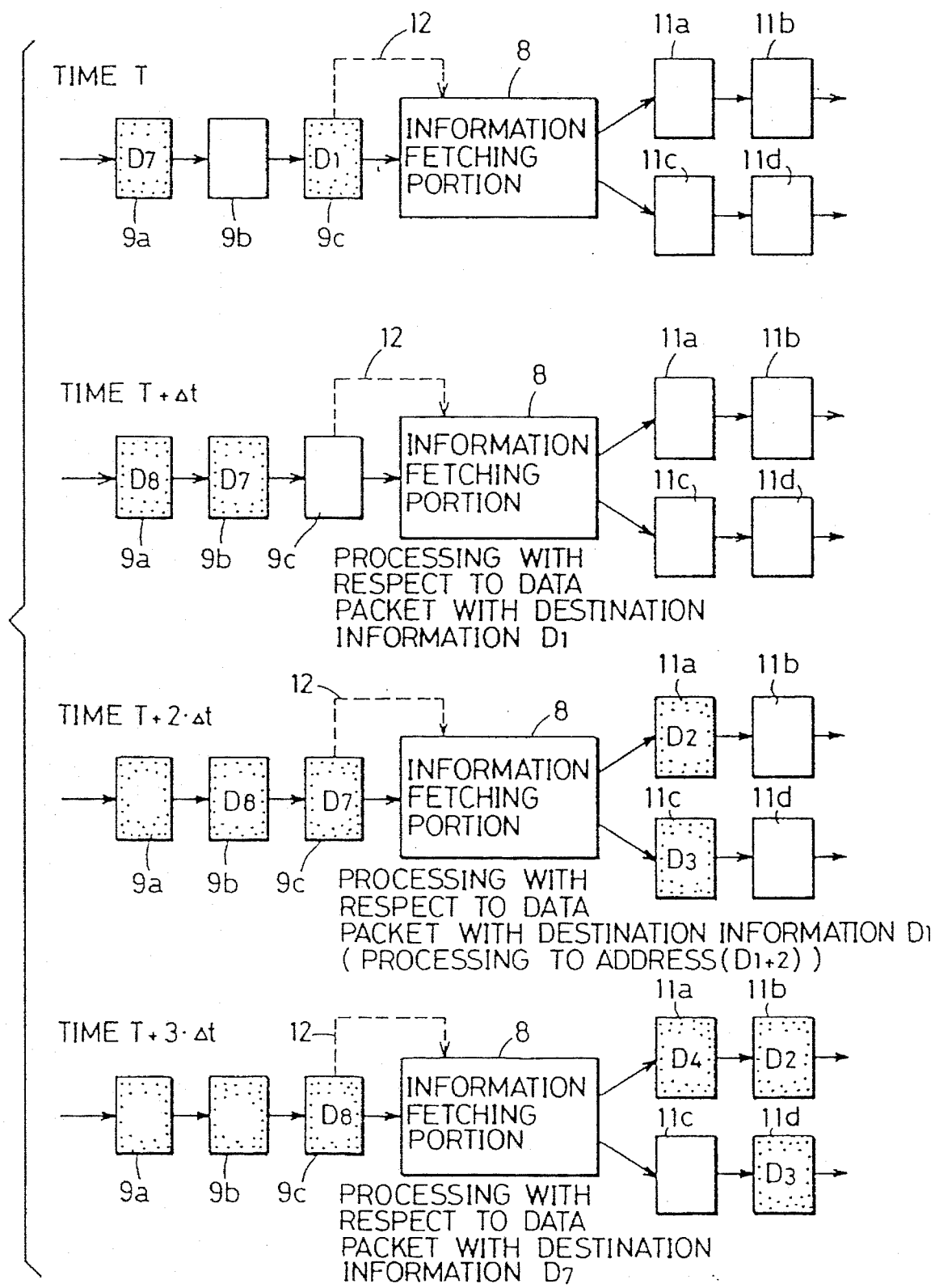
FIG. 5 is a schematic diagram showing another example of an execution state of the present embodiment.

FIG. 5 is a schematic diagram showing another example of an execution state of the data flow program shown in FIGS. 10 and 11.

FIG. 5 shows a case wherein data packets flow at a low rate in the input buffer 10 of the program storing portion 1 and some data latches hold no data packet.

At time T, the data latches 9c and 9a of the input buffer 10 hold a data packet including the destination information D1 and a data packet including the destination information D7, respectively, while the data latch 9b holds no data packet.

At time T+$\Delta$t, the information fetching portion 8 performs a processing with respect to a data packet including the destination information D1. At this time, there exists no data packet in the data latch 9c. In addition, the contents of the part addressed based on the destination information D1 has three destinations as shown in FIGS. 10 and 11. The information fetching portion 8 performs the above-described (2) processing accordingly.

As a result, a data packet including the destination information D2 and a data packet including the destination information D3 are respectively output to the data latches 11a and 11c at time T+2·Δt. Meanwhile, the information fetching portion 8 internally generates a data packet including destination information (D1+2) in place of the destination information D1 to continue a processing with respect to a data packet including the destination information (D1+2).

As a result, a data packet including the destination information D4 is output to the data latch 11c at time T+3·Δt. At this time, the information fetching portion 8 performs a processing with respect to the data packet including the destination information D7.

Figure 12:
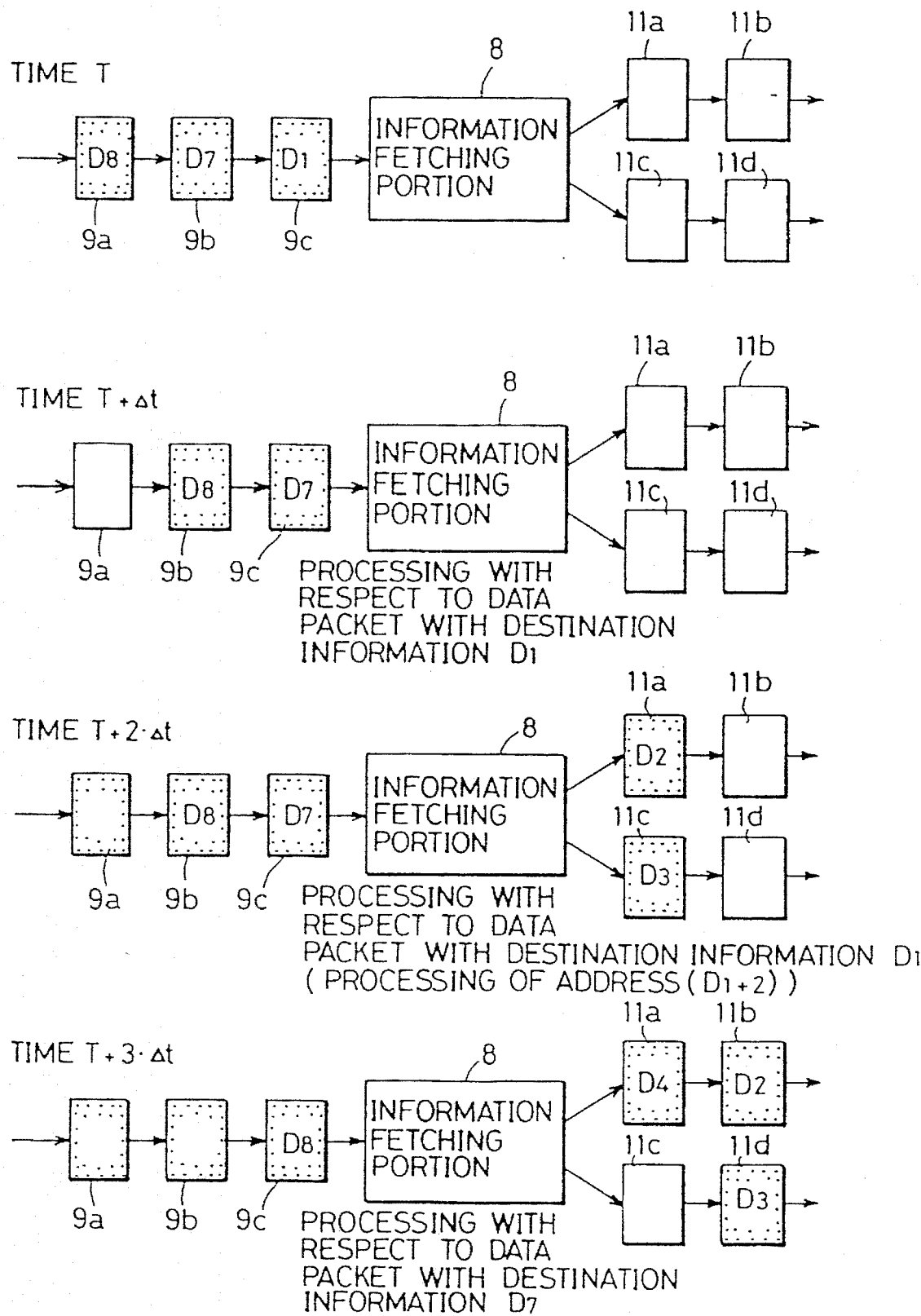
FIG. 12 is a schematic diagram showing a conventional execution state of the data flow program of FIGS. 10 and 11.

This is a state where a copy processing of three or more data packets is performed as in the conventional example shown in FIG. 12. However, there occurs no stay of data packets in the input buffer 10 of the program storing portion 1.

In the above-described embodiment, only a state of the data latch 9c located just preceding to the information fetching portion 8 is observed to observe a flow rate of data packet. It is, however, possible to increase the number of data packets which can be subjected to a copy process without causing data packet stay in the input buffer 10 by observing a plurality of data latches in the input buffer 10 of the program storing portion 1.

Although the present invention has been described and illustrated in detail, it is clearly understood that the same is by way of illustration and example only and is not to be taken by way of limitation, rather the same may be varied in many ways. Such variations are not to be regarded as a departure from the spirit and scope of the present invention and all modifications that would be obvious to one skilled in the art are intended to be included within the scope of the appended claims.

What is claimed is:

1. An execution control method for a data driven type information processing device including a program storing portion having functions of storing a data flow program to generate a new data packet from the data flow program based on an input data packet and performing a copy processing to simultaneously generate a plurality of data packets, said method comprising the steps of:

a) determining the presence of following a data packet in a stage of an input signal path preceding the program storing portion;

b) determining when a number of consecutive copy processings of a data packet in the program storing portion exceeds a number of output signal paths corresponding to the input signal path; and c) limiting the number of copy processings to be executed when a following data packet is present, so as to prevent stay of the data packet in the program storing portion for more than a single execution cycle, limiting being based on the number of output signal paths.

2. A method as in claim 1, further comprising:

d) outputting a data packet encoding a remaining number of copy processings not executed due to step c).

3. The method according to claim 2, wherein:

performing a processing with respect to data packets output from said program storing portion and applying a data packet including the processing result to said program storing portion, said data packet encoding a remaining number of copy processings includes a flag designating pass of the data packet through said data packet processing portion without being subjected to a processing and information for said remaining copy processings.

4. An execution control method for a data driven type information processing device including a program storing portion having functions of storing a data flow program to generate a new data packet from the data flow program based on an input data packet and performing a copy processing to simultaneously generate a plurality of data packets, said method comprising the steps of:

determining a flow rate of data packets to be input to said program storing portion, determining a number of consecutive copy processings, limiting the number of copy processings to be executed to prevent stay of data packets based on said determined flow rate and said determined number of consecutive copy processings, and outputting a data packet for executing copy processings left by said limitation; and performing a processing with respect to data packets output from said program storing portion and applying a data packet including the processing result to said program storing portion, said data packet for executing said left copy processings including a flag designating pass of the data packet through said data packet processing portion without being subjected to a processing and information for said left copy processings;

wherein said data flow program includes a plurality of groups including destination information, instruction information, and copy designating information for designating a copy processing, said data pocket includes destination information and instruction information, said program storing portion includes one input node and two output nodes, reads destination information and instruction information from a subsequent row of the data flow program based on the destination information of an input data packet, outputs a new first data packet including the read destination information and instruction information through one of the output nodes and when said copy designating information is read at the same time as well, said portion outputs a new second data packet including destination information and instruction information of a further subsequent row through the other output node, said limiting step includes a step of outputting said first data packet through said one output node without performing said copy processings when said determined flow rate exceeds a predetermined flow rate and said determined number of consecutive copy processings is two or more, and said information for said left copy processings includes destination information obtained by adding 1 to said destination information read from said data flow program.

5. The method according to claim 4, further comprising the steps of:

outputting said first data packet through said first output node and said second data packet through said the other output node when said determined flow rate is not more than said predetermined flow rate and said determined number of consecutive copy processings is two or more, and holding a third data packet, including said destination information obtained by adding 2 to the destination information included in said first data packet, to perform a copy processing based on the third data packet.

6. The method according to claim 5, wherein said program storing portion comprises:

an input buffer for temporarily holding a data packet to be input to said input node, and information fetching unit for receiving the output of said input buffer to generate said first and second data packets, wherein said step of determining a flow rate includes a step of determining a flow rate based on whether said input buffer holds a data packet or not.

7. A data driven type information processing device comprising:

program storing means for storing a data flow program and for generating a new data packet from the data flow program based on an input data packet and for performing a copy processing to simultaneously generate a plurality of data packets;

occupancy means for determining the presence of a following data packet in a stage of an input signal path preceding the program storing means;

determining means for determining when a number of consecutive copy processings of a data packet in the program storing means exceeds a number of output signal paths corresponding to the input signal path;

limiter means responsive to the occupancy means and the determining means, for limiting the number of copy processings to be executed when a following data packet is present, so as to prevent data packet stay in the program storing means for more than a single execution cycle, limiting being based on the number of output signal paths and the number of consecutive copy processings.

8. The information processing device according to claim 7, wherein said data packet for executing said left copy processings includes a flag for designating pass of the data packet through said data packet processing means without being subjected to a processing and information for said left copy processings.

9. A device as in claim 7, further comprising:

remainder means for generating a data packet encoding a remaining number of copy proceedings not executed due to operation of the limiter means.

10. A data driven type information processing device comprising:

program storing means for storing a data flow program and serving to generate a new data packet from the data flow program based on an input data packet and performing a copy processing to simultaneously generate a plurality of data packets, said program storing means limiting the number of copy processings to be executed to prevent data packet stay based on a flow rate of data packets to be input and the number of consecutive copy processings and outputting a data packet for executing copy processings left by said limitation, and data packet processing means for performing a processings with respect to data packets output from said program storing means and applying a data packet including the processing result to said program storing means;

wherein said data packet for executing said left copy processings includes a flag for designating pass of the data packet through said data packet processing means without being subjected to a processing and information for said left copy processings;

wherein said data flow program includes a plurality of pairs of destination information and instruction information, and copy designating information for designating a copy processing, said data packet includes destination information and instruction information, said program storing means includes one input node and two output nodes, reads destination information and instruction information from a subsequent row of data flow program based on the destination information of an input data packet, outputs a new first data packet including read destination information and instruction information through one of the output nodes and when said copy designating information is read at the same time as well, said means outputs a new second data packet including destination information and instruction information of a further subsequent row through the other output node, and said data packet processing means comprising:

data pair detecting means having two input nodes coupled to said two output nodes of said program storing means for detecting two data packets having the same destination information to output a new data packet including the destination information, the instruction information and the data of one of the data packets and data of the other data packet, and operation processing means responsive to a data packet output from said data pair detecting means for performing an operation processing based on the instruction information included in the data packet.

11. The information processing device according to claim 10, wherein said program storing means outputs, through said one output node, said first data packet without being subjected to said copy processing and outputs, through said the other output node, a data packet including the destination information obtained by adding 1 to said destination information read from said data flow program as said information for said left copy processing when a flow rate of data packets applied to said input port exceeds a predetermined flow rate and the number of consecutive copy processings is 2 or more.

12. The information processing device according to claim 11, wherein said program storing means outputs said first data packet thorough said one output node, outputs second data packet through said the other output node and holds a third data packet including destination information obtained by adding 2 to the destination information included in said first data packet to perform a copy processing based on the third data packet when a flow rate of data packets to be input is not higher than said predetermined rate and said number of consecutive copy processings is 2 or more.

13. The information processing device according to claim 12, wherein said program storing means comprises:

input buffer means for temporality holding a data packet to be input to said input node, and information fetching means receiving the output of said input buffer to generate said first and second data packets, and said program storing means determines a flow rate based on whether said input buffer means holds a data packet or not.

14. In a data driven processor operating on at least one stream of data packets, each data packet including a number of copy processes to be performed, the processor having fewer input signal paths than corresponding output signal paths, a method for controlling execution of data packets comprising the steps of:

(a) inputting a data packet from an input signal path;

(b) determining, from the inputted data packet, whether an original number of copy processes exceeds a number of output signal paths corresponding to the input signal path;

(c) detecting, when the original number of copy processes exceeds the number of output signal paths, whether a data packet is present in a preceding stage of a buffer in the input signal path;

(d) executing an alpha quantity of copy processes equal to the number of output signal paths minus one;

(e) modifying, when data packet presence in the preceding stage is detected, the inputted data packet to form a modified data packet including a modified number of copy processes equal to the original number of copy processes minus the alpha quantity; and (f) recirculating the modified data packet, the steps (e) and (f) preventing data packets from staying in any stage of any input buffer longer than an amount of time necessary to process a data packet that has a number of copy processes less than or equal to the number of output signal paths.

15. A method as in claim 14, further comprising the steps of:

(g) retaining, after the step of executing, when data packet presence in the preceding stage is not detected, the inputted data packet; and (h) determining a remainder number of copy processes to be performed equal to the original number of copy processes minus the number of output signal paths; and (i) completing, if the remainder equals the number of output signal paths, a beta quantity of copy processes equal to the number of output signal paths.

16. A method as in claim 14, further comprising the steps of:

if the remainder is greater than the number of output signal paths, repeating the steps of (d) executing, (e) modifying, and (f) recirculating, when data packet presence is detected in the preceding stage; and repeating, when data packet presence in the preceding stage again is not detected, the steps of (g) retaining and (h) determining.

17. A method as in claim 15, further comprising the step of:

adding, when the remainder is greater than the number of output signal paths, two to destination information of the modified data packet.

18. A method as in claim 15, further comprising the step of:

(j) setting, when the remainder is greater than the number of output signal paths, a through-packet flag to off.

19. A method as in claim 14, wherein the step of modifying further comprises:

adding one to destination information of the modified data packet.

20. A method as in claim 14, wherein the step of modifying further comprises:

setting a through-packet flag to on.

21. A method as in claim 14, further comprising the step of:

(k) setting, when the original number of copy processes does not exceed the number of output signal paths, a through-packet flag to off.

22. A data driven information processing apparatus comprising:

at least one input signal path including at least one input buffer, the input buffer comprising at least two stages, each input signal path receiving a stream of data packets, each data packet including a number of copy processes to be performed;

fetching means, responsive to an output of a data packet from the at least one input signal path, for controlling execution of inputted data packets and outputting data packets as a function of the execution;

at least two output signal paths connected to the fetching means, each input signal path corresponding to at least two output signal paths;

the fetching means further comprising:

determining means, responsive to the inputted data packet, for determining whether an original number of copy processes exceeds a number of output signal paths corresponding to the input signal path;

a detector for detecting whether a data packet is present in a preceding stage of the signal path and outputting a presence signal indicative of presence thereof;

a copy processor, responsive to the inputted data packet, for processing an alpha quantity of copy processes equal to the number of output signal paths minus one; and a modifier, responsive to the presence signal from the detector and responsive to the determining means determining that the original number of copy processes exceed the number of output signal paths, for modifying the inputted data packet to form a modified data packet including a modified number of copy processes equal to the original number of copy processes minus the alpha quantity, the fetching means recirculating the modified data packet, the fetching means preventing data packets from staying in any stage of any input signal path longer than an amount of time necessary to process a data packet that has a number of copy processes less than or equal to the number of output signal paths.

23. An apparatus as in claim 22, the fetching means further comprising:

retaining means, responsive to an absence of the presence signal, for retaining the inputted data packet; and remainder means, responsive to an absence of the presence signal, for determining a remainder number of copy processes to be performed equal to the original number of copy processes minus the number of output signal paths;

the copy processor, responsive to the remainder determined by the remainder means, if the remainder equals the number of output signal paths, completing a beta quantity of copy processes equal to the number of output signal paths.

24. An apparatus as in claim 23, wherein, when the remainder is greater than the number of output signal paths and a data packet in the preceding stage is detected:

the copy processor processes another alpha quantity of copy processes; and the modifier and the fetching means, again modify and recirculate, respectively, another modified data packet.

25. An apparatus as in claim 23, wherein, when the remainder is greater than the number of output signal paths and a data packet is not present in the preceding stage:
the copy processor processes a beta quantity of copy processes; and
the retaining means and the remainder means, again retain and determine, respectively.

26. An apparatus as in claim 23, wherein the fetching means further comprises:
an adder, responsive to when the remainder from the remainder means is greater than the number of output signal paths, for adding two to destination information of the modified data packet.

27. An apparatus as in claim 23, wherein the fetching means further comprises:
setting means, responsive to absence of a data packet in the preceding stage, for setting a through-packet flag to off.

28. An apparatus as in claim 22, wherein the fetching means further comprises:
an adder, responsive to the determining means determining that the original number of copy processes exceeds the number of output signal paths, for adding one to destination information of the modified data packet.

29. An apparatus as in claim 22, wherein the fetching means further comprises:
setting means, responsive to the determining means determining that the original number of copy processes exceeds the number of output signal paths, for setting a through-packet flag to on.

30. An apparatus as in claim 22, wherein the fetching means further comprises:
setting means, responsive to a determination by the determining means that the original number of copy processes does not exceed the number of output signal paths, for setting a through-packet flag to off.

* * * * *